(12) United States Patent
Gullin et al.

(10) Patent No.: US 9,367,580 B2
(45) Date of Patent: Jun. 14, 2016

(54) METHOD, APPARATUS AND COMPUTER PROGRAM FOR DETECTING DEVIATIONS IN DATA SOURCES

(71) Applicant: Telefonaktiebolaget L M Ericsson (publ), Stockholm (SE)

(72) Inventors: Patrick Gullin, Karlskrona (SE); Andreas Torstensson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/438,736

(22) PCT Filed: Sep. 5, 2013

(86) PCT No.: PCT/SE2013/051034
§ 371 (c)(1),
(2) Date: Apr. 27, 2015

(87) PCT Pub. No.: WO2014/070070
PCT Pub. Date: May 8, 2014

(65) Prior Publication Data
US 2015/0293965 A1 Oct. 15, 2015

Related U.S. Application Data

(60) Provisional application No. 61/829,381, filed on May 31, 2013.

(30) Foreign Application Priority Data

Nov. 1, 2012 (EP) .................................... 12190962

(51) Int. Cl.
*G06F 17/30* (2006.01)
*G06F 11/34* (2006.01)

(52) U.S. Cl.
CPC ...... *G06F 17/30371* (2013.01); *G06F 11/3452* (2013.01); *G06F 17/30303* (2013.01); *G06F 17/30578* (2013.01)

(58) Field of Classification Search
CPC ..................... G06F 17/30578; G06F 17/30303
USPC .......................................................... 707/690
See application file for complete search history.

(56) References Cited

U.S. PATENT DOCUMENTS 5,813,002 A    9/1998  Agrawal et al.
7,716,068 B2 * 5/2010  Ball ...................... G06F 19/326
                                                  600/300

(Continued)

OTHER PUBLICATIONS

Imberman, S. "Comparative Statistical Analyses of Automated Booleanization Methods for Data Mining Programs." Dissertation submitted to the Graduate Faculty in Computer Science for the degree of Doctor of Philosophy, the City University of New York, Jun. 1 1999, pp. 1-103, retrieved from the Internet <http://www.cs.csi.cuny.edu/~iberman/papers/Thesis1999.pdf>.

(Continued)

*Primary Examiner* — Joshua Bullock
(74) *Attorney, Agent, or Firm* — Coats & Bennett, P.L.L.C.

(57) ABSTRACT

The present disclosure describes a method and an apparatus for detecting deviations in data sources, each data source comprising a plurality of data posts, each data post comprising a number of data values. The method comprises identifying (102) data post pairs, each pair comprising a first data post in a first data source and a second data post in a second data source, wherein, for a unique matching data attribute of the first data post and the second data post in a data post pair, a subset of the data value is equal. The method further comprises determining (104) whether individual of a plurality of combinations of data values of the first data post with data values of the second data post within each of the plurality of data post pairs fulfill individual of a plurality of relation pattern algorithms, and determining (106) a conformity level for the determined fulfillment of relation pattern algorithms for the plurality of data post pairs. The method further comprises selecting (108) relation pattern algorithm from the plurality of relation pattern algorithms based on the determined conformity level, and analyzing (110) data value combinations of individual data post pairs in relation to the selected relation pattern algorithm in order to detect data value combinations of individual data post pairs that does not conform to the selected relation pattern algorithm, a non-conformance indicating (114) a possible deviation in data of the individual data post pair.

23 Claims, 10 Drawing Sheets

(56) References Cited

U.S. PATENT DOCUMENTS

| | | | |
|---|---|---|---|
| 7,908,249 B1 | 3/2011 | Gupta et al. | |
| 8,918,677 B1* | 12/2014 | Marokhovsky | G06F 11/16 707/687 |
| 2004/0034699 A1* | 2/2004 | Gotz | H04L 12/24 709/223 |
| 2004/0181512 A1 | 9/2004 | Burdick et al. | |
| 2007/0067278 A1* | 3/2007 | Borodziewicz | G06F 17/30675 |
| 2007/0282824 A1* | 12/2007 | Ellingsworth | G06F 17/30616 |
| 2009/0244290 A1* | 10/2009 | McKelvey | H04N 7/173 348/181 |
| 2010/0257149 A1* | 10/2010 | Cognigni | G06F 17/30575 707/698 |
| 2011/0138312 A1* | 6/2011 | Yeh | G06F 17/30539 715/771 |
| 2014/0074731 A1* | 3/2014 | Lande | G06Q 10/06395 705/306 |
| 2014/0089310 A1* | 3/2014 | Myers | G06F 17/3071 707/737 |

OTHER PUBLICATIONS

Bilenko, M. et al. "Adaptive Duplicate Detection Using Learnable String Similarity Measures." To appear in Proceedings of the Ninth ACM SIGKDD International Conference on Knowledge Discovery and Data Mining (KDD-2003), Washington D.C., Aug. 2003, pp. 1-10.

Kumar, R. et al. "Attribute Correction-Data Cleaning Using Association Rule and Clustering Methods." International Journal of Data Mining & Knowledge Management Process (IJDKP) vol. 1, No. 2, Mar. 2011, pp. 22-32.

* cited by examiner

METHOD, APPARATUS AND COMPUTER PROGRAM FOR DETECTING DEVIATIONS IN DATA SOURCES

TECHNICAL FIELD

The present disclosure relates generally to a method, an apparatus and a computer program for detecting deviations in data sources.

BACKGROUND

In most enterprises, such as mobile communication operators, information is spread over many different data sources. It is not unusual that data stored in different sources is duplicated or at least means the same thing. When data that is expected to be the same, for some reason is not the same, unwanted problems can occur, for example, in a mobile communication network, the user of a mobile phone being unable to make a phone call, or the operator being unable to charge the customer etc. Thus, inconsistent data can cause a lot of trouble. According to investigations of the applicant, the average mobile communications operator revenue leakage is approximately 2% and a large part of this revenue leakage is a direct or indirect consequence of inconsistent data leading to ambiguous registrations of communications usage which therefore cannot be charged for.

There are tools on the market today that scan data sources in order to find data inconsistencies, or data deviations. One common problem for such tools is that the tools have to be instructed what to look for in the data sources. Since each data system comprises data sources in which data stored have their own data structure, the tool must be instructed for each data source combination that is to be scanned. I.e. the tool needs instruction about the data sources' data models and also how the data models relate to each other. However, different systems or sources may come from different vendors and it can be hard to get access to documentation that describes the data models. Another problem is that the data models are often so complex that even if someone knows or has access to the description of one data model it is hard to tell how it relates to another data model. Another issue is that for finding a data deviation, it may also be necessary to understand what is considered to be a deviation and what is not considered to be a deviation.

Also, data in data sources may change with time. In such cases, what is considered to be a data deviation may change in time.

Consequently, there is a need for a tool for efficiently detecting data deviations between data of different data sources.

SUMMARY OF INVENTION

It is an object of the invention to address at least some of the problems and issues outlined above. It is possible to achieve these objects and others by using a method and an apparatus as defined in the attached independent claims.

According to a first aspect, a method is provided for detecting deviations in data sources, each data source comprising a plurality of data posts, each data post comprising a number of data values. The method comprises identifying data post pairs, each pair comprising a first data post in a first data source and a second data post in a second data source, wherein, for a unique matching data attribute of the first data post and the second data post in a data post pair, a subset of the data value is equal. In addition, the method comprises determining whether individual of a plurality of combinations of data values of the first data post with data values of the second data post within each of the plurality of data post pairs fulfil individual of a plurality of relation pattern algorithms. Also, the method comprises determining a conformity level for the determined fulfillment of relation pattern algorithms for the plurality of data post pairs, and selecting relation pattern algorithm from the plurality of relation pattern algorithms based on the determined conformity level. The method further comprises analyzing data value combinations of individual data post pairs in relation to the selected relation pattern algorithm in order to detect data value combinations of individual data post pairs that does not conform to the selected relation pattern algorithm, a non-conformance indicating a possible deviation in data of the individual data post pair.

By such a method possible deviations between data of two data sources with comparable data posts can be automatically detected. For example, faults in data of any of the two comparable data sources can be automatically detected. If such data faults, or data value faults, are detected, they can easily be alleviated and problems occurring due to such faults can be avoided. A possible use case is for comparable large databases of mobile communication operators. In this use case, an example of a problem that can be avoided, is that it if there are deviations in two comparable databases, it may not be clear who to bill for a made phone call, which results in lost revenue for the operator. Further, the method makes it possible to select the relation pattern algorithm that is best suited for the relation of an individual data value combination out of a plurality of relation pattern algorithms, which results in an improved accuracy in finding deviations.

According to a second aspect, an apparatus is provided for detecting deviations in data sources, each data source comprising a plurality of data posts, each data post comprising a number of data values. The apparatus comprises an identifying unit for identifying data post pairs, each pair comprising a first data post in a first data source and a second data post in a second data source, wherein, for a unique matching data attribute of the first data post and the second data post in a data post pair, a subset of the data value is equal. In addition, the apparatus comprises a determining unit for determining whether individual of a plurality of combinations of data values of the first data post with data values of the second data post within each of the plurality of data post pairs fulfil individual of a plurality of relation pattern algorithms, and for determining a conformity level for the determined fulfillment of relation pattern algorithms for the plurality of data post pairs. The apparatus further comprises a selecting unit for selecting relation pattern algorithm from the plurality of relation pattern algorithms based on the determined conformity level, and an analyzing unit for analyzing data value combinations of individual data post pairs in relation to the selected relation pattern algorithm in order to detect data value combinations of individual data post pairs that does not conform to the selected relation pattern algorithm, a non-conformance indicating a possible deviation in data of the individual data post pair.

According to a third aspect, A computer program is provided comprising computer readable code means, which when run in an apparatus configured for detecting deviations in data sources causes the apparatus to perform the following steps: Identifying data post pairs, each pair comprising a first data post in a first data source and a second data post in a second data source, wherein, for a unique matching data attribute of the first data post and the second data post in a data post pair, a subset of the data value is equal; Determining whether individual of a plurality of combinations of data values of the first data post with data values of the second data post within each of the plurality of data post pairs fulfil individual of a plurality of relation pattern algorithms; Determining a conformity level for the determined fulfillment of relation pattern algorithms for the plurality of data post pairs, Selecting relation pattern algorithm from the plurality of relation pattern algorithms based on the determined conformity level; And analyzing data value combinations of individual data post pairs in relation to the selected relation pattern algorithm in order to detect data value combinations of individual data post pairs that does not conform to the selected relation pattern algorithm, a non-conformance indicating a possible deviation in data of the individual data post pair.

BRIEF DESCRIPTION OF DRAWINGS

The invention is now described, by way of example, with reference to the accompanying drawings, in which.

DESCRIPTION OF EMBODIMENTS

Briefly described, a solution is provided to detect deviations in data sources, more specifically in data of at least two different data sources. The solution is at least partly built on the idea that by identifying patterns in relations between data of two data sources also deviations from such patterns can be identified.

In this disclosure, "a data source" could be any type of place where data is stored, temporary or in a long-term. A data source is any entity that holds data such as database or a document etc. Examples of data sources are a relation database accessed via Structured Query Language (SQL) or a directory service accessed via Lightweight Directory Access Protocol (LDAP). Other examples are a Microsoft® Excel file, a Comma Separated Values (CSV) file or an Extended Markup Language (XML) file.

In this disclosure, a data post may be a row in a data source, such as a row in an SQL database table, a row in a Microsoft® Excel file/sheet, a row in a CSV file or an LDAP entry. A data attribute may be a column in a data source, such as an SQL database table, a column in a Microsoft® Excel file/sheet, a column in a CSV file, or an attribute in an LDAP tree. Of course, it may be the other way around, i.e. a data post may be a column in a data source, and a data attribute may be a row in a data source. One data attribute may comprise the data values of one data attribute category. A data attribute category may be e.g. personal identity numbers, or mobile phone numbers (e.g. MSISDN number, Mobile Station Integrated Services Digital Network number). A data post comprises a number of data values, each value being valid for this data post, e.g. the personal identity number and mobile phone number for a certain user connected to this data post, also the name of the user may be one data value for this data post. E.g. the data values of a data post may be personal identity number 341001, and MSISDN number 010-2222222, and the name John Smith. A data attribute may comprise the data values concerning the same data attribute category.

Figure 1:
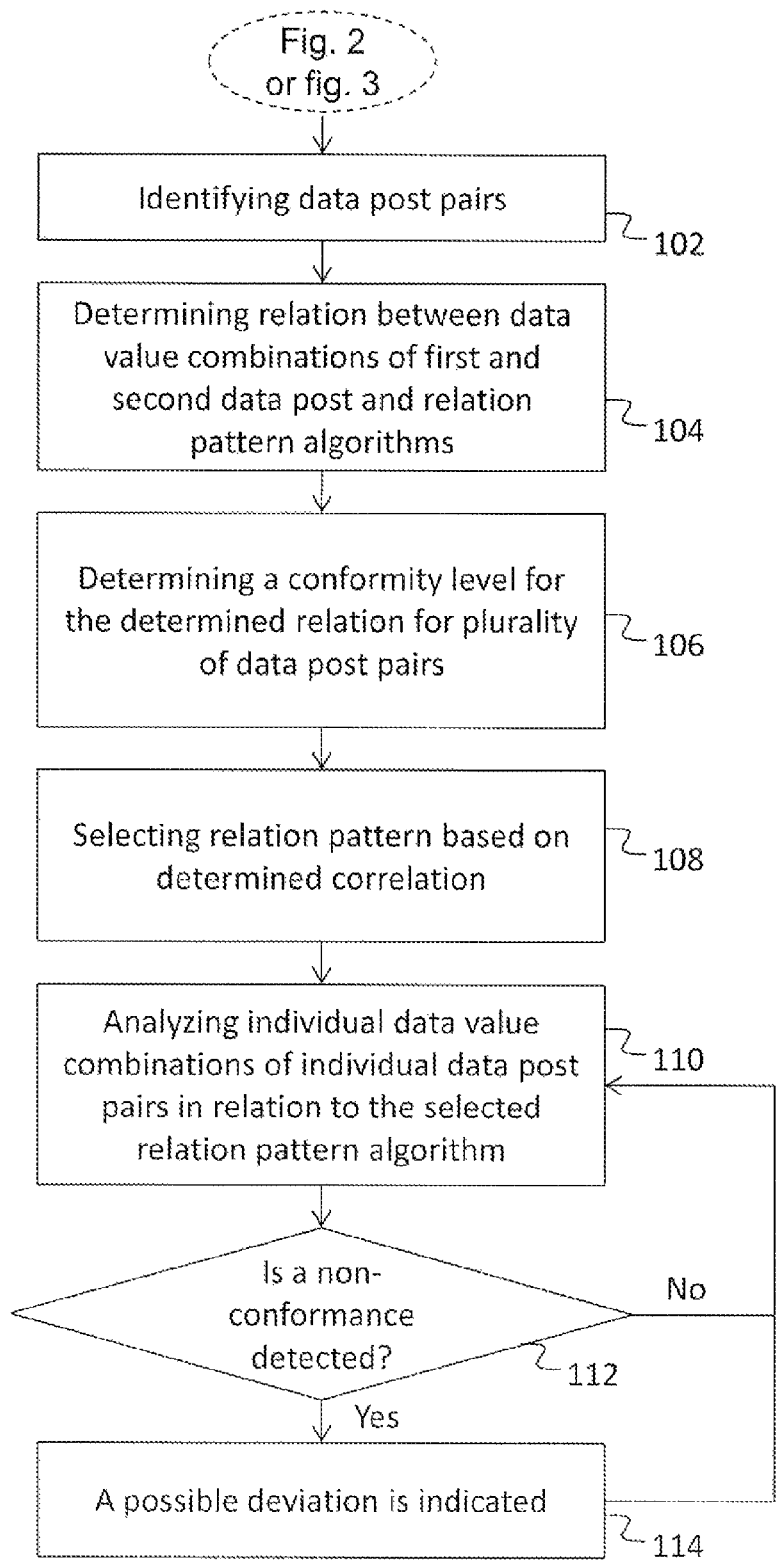
FIGS. 1-6 show flow charts describing methods according to embodiments of the invention.

In FIG. 1 a method for detecting deviations in data sources according to an embodiment is described. Each data source comprises a plurality of data posts; each data post comprises a number of data values. The method comprises identifying 102 data post pairs, each pair comprising a first data post in a first data source and a second data post in a second data source, wherein, for a unique matching data attribute of the first data post and the second data post in a data post pair, a subset of the data value is equal. The method further comprises determining 104 whether individual of a plurality of combinations of data values of the first data post with data values of the second data post within each of the plurality of data post pairs fulfil individual of a plurality of relation pattern algorithms. The method further comprises determining 106 a conformity level for the determined fulfillment of relation pattern algorithms for the plurality of data post pairs, and selecting 108 relation pattern algorithm from the plurality of relation pattern algorithms based on the determined conformity level. The method further comprises analyzing 110 data value combinations of individual data post pairs in relation to the selected relation pattern algorithm in order to detect data value combinations of individual data post pairs that does not conform to the selected relation pattern algorithm, a non-conformance indicating 114 a possible deviation in data of the individual data post pair.

A unique matching data attribute is a data attribute whose values are all different, i.e. a data value of the unique matching data attribute for a data source only occurs once. A unique matching data attribute of a first data source matches a unique matching data attribute of a second data source in that the same data value exists in a first data post in the first data source and in a second data post in the second data source; what is called a data post pair has been found. In a data source context it may also be called a "join" Unique data post pairing can for example be achieved by sorting the data in each data source on unique attributes/columns. Unique data post pairing can also be achieved via internal or external system services that provide JOIN functionality e.g. joining two tables in relation database. A subset is a part of the data value. A subset of the data value being equal signifies that a subset of the data value of the first data post is equal to a subset of the data value of the second data post. The size of the subset may be decided according to a certain rule, and may comprise the same amount of data (i.e. same number of digits for example) of the data value for the plurality of data posts. A subset may also be the whole data value. A relation pattern algorithm is an algorithm that determines whether the value "a" in the first data post has a relation to the value "b" in the second data post, which relation fulfils requirements set by the algorithm. An example of a simple relation pattern algorithm is "a=b".

By such a method it is possible to automatically detect deviations between two data sources that have a common unique identifier. By being able to select a relation pattern algorithm that is adapted to the normal relation of a first data value from the first source and a second data value from the second source for other data post pairs when checking whether the first data value and the second data value for one data post pair conforms or not to a relation pattern algorithm, it is possible to achieve a high level of correctly indicated deviations, deviations that are related to faults in any of the sources.

According to an embodiment, the conformity level is determined 106 for combinations of data values relating to the same data attribute combination for the plurality of data post pairs. "Combinations of data values relating to the same data attribute combination" signifies the data value combinations of the first data attribute in the first data post pair with the second data attribute in the second data post pair, for all of the plurality of data post pairs. In other words, the determined conformity for the fulfillment of individual relation pattern algorithms is determined for individual points in a relation matrix as a total conformity for the individual point for all relation matrices.

According to an embodiment, the determining 104 of a fulfillment comprises combining the data values of the first data post with the data values of the second data post within each of the plurality of data post pairs in a comparison matrix $H_{xy}$ for each of the plurality of data post pairs, where x indicates number of data attributes of the first data post and at the same time indicates number of columns of the matrix and y indicates number of data attributes of the second data post and at the same time indicates number of rows of the matrix. A comparison matrix $A_{xy}$ is a matrix where the data values of the first data post is combined with the data values of the second data post, possibly all combinations, one data value of the first data post is combined with one data value of the second data post, such that a matrix is created with x*y points.

According to an embodiment, the same data attribute combination concerns same position $n_{ab}$ in the comparison matrix $H_{xy}$ where a=any of integer 1 to x, b=any of integer 1 to y, for the plurality of data post pairs. A data attribute combination comprises all individual data value combinations for position $n_{ab}$ in comparison matrices for individual data post pairs. One individual data value combination $n_{ab}$ indicates a combination of the data value in "a" with the data value in "b" for one data post pair.

Figure 2:
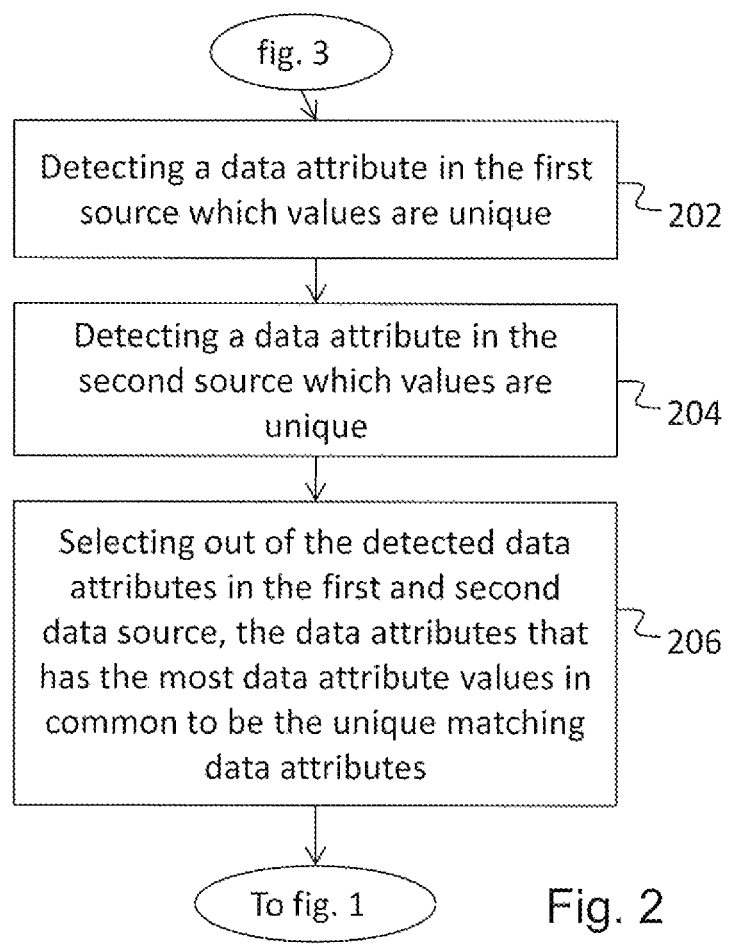

According to an embodiment, the selecting 108) comprises selecting relation pattern algorithms individually for combinations of data values relating to same data attribute combination for the plurality of data post pairs based on the determined conformity level According to an embodiment, which is also described in FIG. 2, the method may further comprise detecting 202 at least one data attribute in the first data source which data values are unique; and detecting 204 at least one data attribute in the second data source which data values are unique. The method may further comprise selecting 206, out of the detected at least one data attributes in the first data source and the detected at least one data attributes in the second data source, the data attribute in the first data source and the data attribute in the second data source that has the most data values in common to be the unique matching data attribute of the first data source and the unique matching data attribute of the second data source. That a data attribute has unique data values signifies that equal data value, or subset of a data value, is only used once for the data attribute in the data source. By such an embodiment it is possible to automatically select unique matching data attributes for the first and the second data source, which unique matching data attributes may be used in the method described in relation to FIG. 1.

According to an embodiment, the method further comprising sorting the data posts in the first and/or the second data source in an increasing or decreasing data value order of data values of the unique matching data attribute. The data posts in a data source may need to be sorted in an increasing or decreasing data value order if they are not already sorted. The data posts are sorted based on the data values of the unique matching data attribute for each post. Thereby it is easier and quicker to identify data post pairs than if the data posts are not sorted.

Meta Data Analysis.

Figure 3:
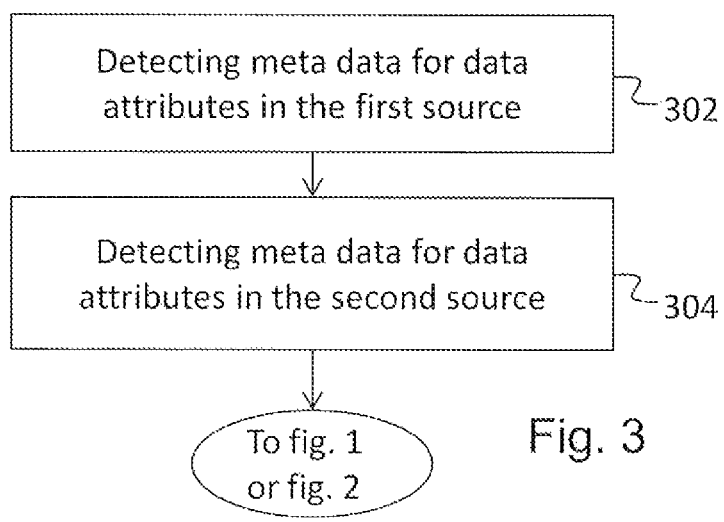

A meta data analysis may be for example evaluating data type, or characteristics of a data attribute, or of meta data of a data attribute. According to an embodiment, which is described in FIG. 3, the method further comprises for the first data source, detecting 302 meta data for data attributes of the first data source by exposing data values for a set of value type algorithms that determine characteristics of the data values for the data attributes, and for the second data source, detecting 304 meta data for data attributes of the second data source by exposing data values for a set of value type algorithms that determine characteristics of the data values for the data attributes. Meta data may be for example data type "numerical value", data type "Boolean value" (true/false, 1/0), data attributes with unique data values", data attributes with sorted values", i.e. the values in a data attribute are sorted, text strings etc. A value type algorithm is an algorithm that if tested on a data value shows if the value is of a certain type, e.g. a Boolean value type algorithm shows if the value type is Boolean, or if the values for a data attribute have a certain characteristics or meta data. Exposing a data value for a set of value type algorithms signifies testing a number of algorithms on the data value to see if the data value or values match any of the algorithms. By detecting meta data for data attributes for the individual data sources it is possible to detect deviations within the sources by detecting that a data value of a data post deviates from other data values of other data posts for that data attribute. Further, information of meta data such as "data attributes with unique data values" may be used as input for determining unique matching data attribute of a data source in the method according to embodiments. This is also realized in the following embodiment: The detecting 302 of meta data in the first data source comprises the detecting 202 of at least one data attribute in the first data source which data values are unique, and the detecting 304 of meta data in the second data source comprises the detecting 204 of at least one data attribute in the second data source which data values are unique.

According to an embodiment, the selecting 108 of relation pattern algorithm from the plurality of relation pattern algorithms based on the determined conformity level is only performed when there is a relation pattern algorithm out of the plurality of relation pattern algorithms for which the determined conformity level is above a defined threshold. For example, the conformity level of a certain relation pattern algorithm to an individual data attribute combination for all (or at least many) data post pairs has to be above a threshold of e.g. 70% for the relation pattern algorithm to be possible to select for finding deviations of this individual data attribute combination. If there is no relation pattern algorithm that fulfils the criteria, this individual data attribute combination will not be checked for finding deviations. In other words, no reliable relation has been found between values of this individual data attribute combination. The threshold may be set differently for different algorithms, and/or differently for different data attribute combinations.

According to an embodiment, when there are more than one relation pattern algorithm of the plurality of relation pattern algorithms that has a determined conformity level above the defined threshold, the selecting 108 of relation pattern algorithm comprises using a priority algorithm to decide which of the more than one relation pattern algorithms to select. If, according to an example, a certain data value combination fulfils the x in y algorithm in 95% of the cases, and the x=y algorithm in 90% of the cases, the x=y algorithm is still selected because it is prioritized. It should be observed that this example is merely just an example of a priority algorithm; there are many other priority algorithms possible. For example, it may be possible that x in y is prioritized in the same level as x=y, i.e. that the algorithm that has the highest conformity level is selected.

The following example shows the invention when used on two exemplifying databases (DB), a first database, DB1 and a second database, DB2. Note that the example as shown is only used for explaining the invention and the terms in the invention using example values. It should not be interpreted as limiting the invention. In Table 1, DB1 is shown and in table 2, DB2 is shown. DB1 has four data posts and three data attributes. DB2 has four data posts and four data attributes.

TABLE 1

| A1  | B1           | C1          |
|-----|--------------|-------------|
| 001 | Mary Shelley | +44 1234567 |
| 002 | Mary Poppins | +44 654322  |
| 003 | Donald Duck  | +1 4444455  |
| 005 | Johnny Puma  | +46 333222  |

TABLE 2

| A2  | B2     | C2      | D2         |
|-----|--------|---------|------------|
| 001 | Mary   | Shelley | 1234567    |
| 002 | Mary   | Poppins | 654321     |
| 003 | Donild | Duck    | 4444455    |
| 004 | Benny  | Guldfot | +46 666677 |

Column A1 from DB1 and column A2 from DB2 are selected as unique matching data attributes since in each database, the data values of A1 and A2, respectively, are unique. Also, the data values of A1 and A2 are partly identical. The data values 001, 002, 003 of A1 and A2 are comparable since they exist in both databases. Consequently, the data post containing 001 in D1 is identified as a data post pair together with the data post containing 001 in D2, the data post containing 002 in D1 is identified as a data post pair together with the data post containing 002 in D2 and the data post containing 003 in D1 is identified as a data post pair together with the data post containing 003 in D2. The data value 004 only exists in A1 and the data value 005 only exists in A2 for which reason these data posts are not identified in the step of identifying data post pairs.

Thereafter, three data post pair combining matrices H1, H2, H3 are created, one for each data post pair: H1 for the data post pair containing 001, H2 for the data post pair containing 002 and H3 for the data post pair containing 003. The combining matrices are shown in tables 3-5 below. In each position in a combining matrix the two data values that are to be combined to determine whether they fulfill a relation pattern algorithm have been written: The data values from DB2 are written in italics and the data values from DB1 are written in plain text to better illustrate their respective origin. For example in position n22, which means row 2, column 2 in matrix H1, Mary Shelley and Mary are written, in position n22 in matrix H2, Mary Poppins and Mary are written, and in position n22 in matrix H3 Donald Duck and Donild are written

TABLE 3

Data post pair combining matrix H1

| 001     | Mary Shelley | +44 1234567 |
|---------|--------------|-------------|
| *001*   | *001*        | *001*       |
| 001     | Mary Shelley | +44 1234567 |
| *Mary*  | *Mary*       | *Mary*      |
| 001     | Mary Shelley | +44 1234567 |
| *Shelley* | *Shelley*  | *Shelley*   |
| 001     | Mary Shelley | +44 1234567 |
| *1234567* | *1234567*  | *1234567*   |

TABLE 4

Data post pair combining matrix H2

| 002       | Mary Poppins | +44 654322 |
|-----------|--------------|------------|
| *002*     | *002*        | *002*      |
| 002       | Mary Poppins | +44 654322 |
| *Mary*    | *Mary*       | *Mary*     |
| 002       | Mary Poppins | +44 654322 |
| *Poppins* | *Poppins*    | *Poppins*  |
| 002       | Mary Poppins | +44 654322 |
| *654321*  | *654321*     | *654321*   |

TABLE 5

Data post pair combining matrix H3

| 003       | Donald Duck | +1 4444455 |
|-----------|-------------|------------|
| *003*     | *003*       | *003*      |
| 003       | Donald Duck | +1 4444455 |
| *Donild*  | *Donild*    | *Donild*   |
| 003       | Donald Duck | +1 4444455 |
| *Duck*    | *Duck*      | *Duck*     |
| 003       | Donald Duck | +1 4444455 |
| *4444455* | *4444455*   | *4444455*  |

In this example there are two different relation pattern algorithms: A first algorithm is defined as whether x=y (x is a value from DB1, y is a value from DB2). A second algorithm is defined as y in x (i.e. whether y is a part of x). It is then determined whether each of the above data value combinations fulfils each of these algorithms. For data value combination n22 in H1 Mary Shelley and Mary fulfils the relation pattern algorithm "y in x". For data value combination n22 in H2 Mary Poppins and Mary fulfils the relation pattern algorithm "y in x", but for data value combination n22 in H3, Donald Duck and Donild does not fulfill the relation pattern algorithm y is a part of x. None of the data value combinations n22 fulfils the pattern x=y. For the data value combination n22 we select to use pattern "y in x" since this pattern has a higher conformity level than the "x=y"-pattern. A data value combination nab for data post pairs that relate to the same position in the matrix is a combination of the same data attributes for the data post pairs.

Such a determination and selection of relation pattern algorithm is performed for all data value combinations, $n_{ab}$ where it is possible to select one. Table 6 below shows the selection of relation pattern algorithm for each data value combination. In the position nab where there is nothing written, there was no conformity determined. In an alternative, the conformity level has to be above a certain degree for a relation pattern algorithm to be selected. Further, in the case that there are conformity for more than one relation pattern algorithm, some algorithms may have priority over other, such as in position 1,1 where both "x=y" and "y in x" are fulfilled. Since "x=y" is a stronger relation than "y in x", "x=y" is selected for this position.

TABLE 6

|    | A1    | B1    | C1    |
|----|-------|-------|-------|
| A2 | x = y |       |       |
| B2 |       | y in x |      |
| C2 |       | y in x |      |
| D2 |       |       | y in x |

Thereafter, individual data value combinations for individual data post pairs are analyzed to see if they fulfill the selected relation pattern algorithm selected for each position $n_{ab}$. The result is a set of found possible data deviations that may be visualized as shown in Table 7.

TABLE 7

|    | A1 | B1 | C1 |
|----|----|----|----|
| A2 |    |    |    |
| B2 |    | 1  |    |
| C2 |    | 0  |    |
| D2 |    |    | 1  |

When going through the combinations, one deviation is found in position 22 and one deviation is found in position 33. When looking at position 22, we can see that the combination Mary Shelley, Mary fulfils the selected algorithm "y in x", Mary Poppins, Mary fulfils the selected algorithm "y in x" but Donald Duck, Donild does not fulfill the selected algorithm "y in x". Consequently, a possible deviation in data has been found here. This is signaled in the system and an operator may for example go in manually in the databases at this point and correct Donild to Donald. In the same way, at data value combination n34 there is a detected deviance between +44 654322 and 654321 (se data post pair combining matrix 2), which is signaled.

It should be noted that this is a very simplified example showing the main principles. The typical scenarios where the solution will be used contain much larger sets of data, where the number of found deviations is very small compared to the total set of data.

According to another embodiment, the invention deals with using computer software to learn a data relation patterns between two data sources, or data sources, by scanning the two data sources. Finding these patterns is done by exposing each data value combination for a set of relation pattern algorithms. If a data value combination conforms to an algorithm of the set of algorithms, the conform level for this algorithm is increased. The conform level may be measured by e.g. a counter. When all data posts are scanned the algorithm with highest conform level for each data value combination becomes the relation pattern to use for finding possible deviations in individual data posts for that data value combination, or intersection in a data value combination matrix, also called a data post pair combining matrix, see table 3-5 for examples.

Doing this for all data attributes/columns between two data sources (SQL table, CSV files, LDAP Entries, Excel sheets etc.), gives a pattern matrix showing the selected algorithm for each intersection in the matrix, see table 6 for an example. Thereafter a second scan, where the values of individual data post pairs are compared to the selected algorithms, is performed. Thereby, posts that deviate from any of the selected relation pattern algorithms can be detected.

Figure 4:
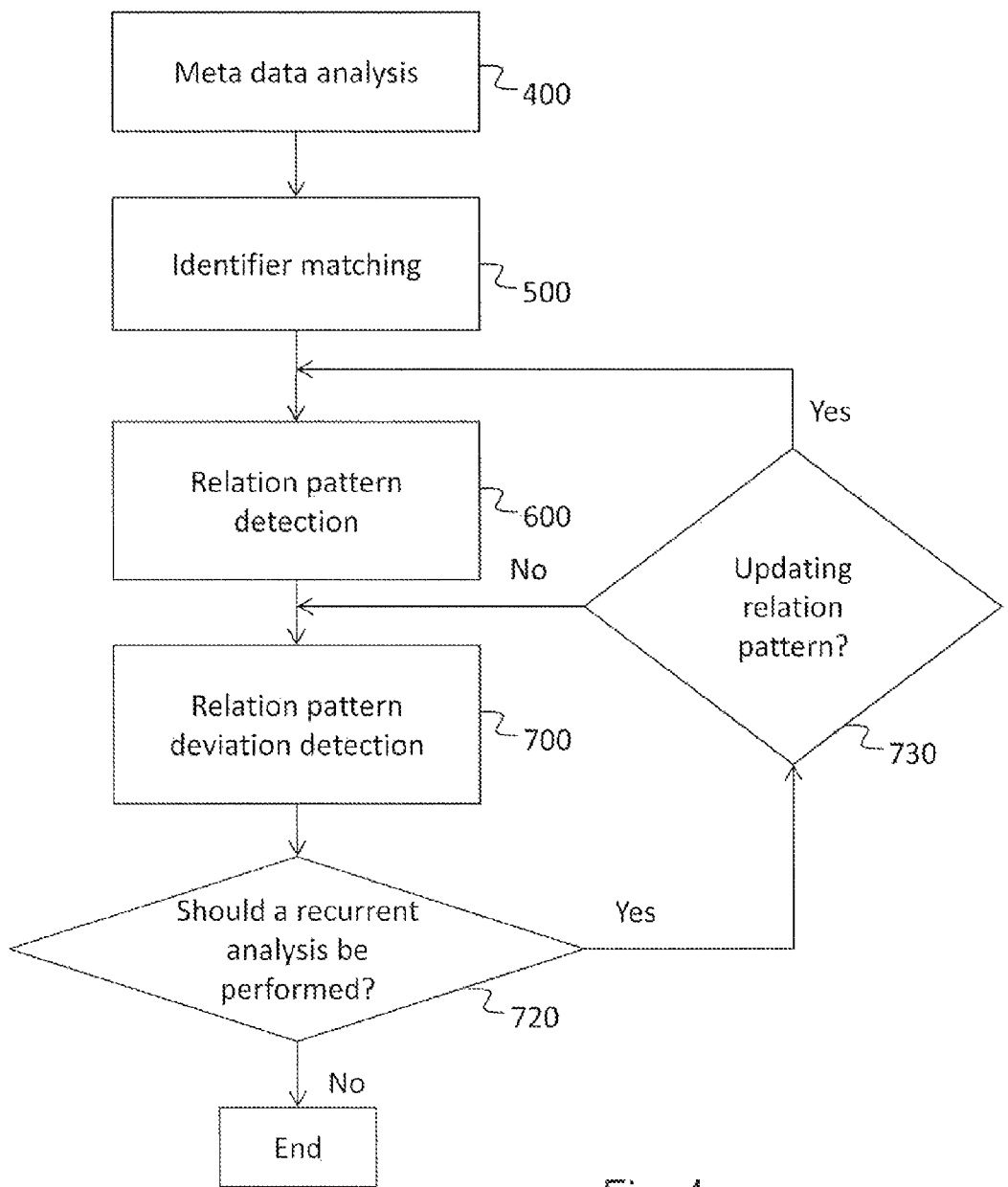

According to another embodiment, shown in FIG. 4, the solution is based on four phases where the two first phases 400, 500 are of an initial nature (setting up preconditions for the last two phases 600, 700. The two first phases 400, 500 may be optional. The four phases 400, 500, 600, 700 does not have to be within the same transaction or process. They can be individually trigged by external actors but it may be necessary that they are at least once trigged in time order. The four phases can be performed in one sequence or parts of the process can be performed recurrently. This is decided by the two alternative choices in step 720.

Meta Data Analysis 400.

In this phase a method is used to analyze meta data to detect data type patterns within a data source by scanning the entire data source, i.e. substantially all data posts of the data source.

This is done be reading post by post and exposing each data value for a set of type algorithms that determine the type, or, in other words characteristics, of the data values in a column in the data source, i.e. characteristics of data values of one data attribute, or data attribute type.

Typical characteristics are for example numerical value, Boolean value, e.g. true/false, 1/0, yes/no etc), columns with unique values, sorted columns etc. By default, e.g. if no characteristics are found in the type pattern detection the values are treated as text. The set of used type algorithms depends on the application context. This method may be used for each data source that will be used in later phases. An alternative to this method is to manually define the characteristics for data in the data source.

Identifier Matching 500

When it has been decided which two data sources that will be further analyzed the first thing that may be done is to determine which column in each data source that will serve as identifier, this column may also be called a unique matching data attribute in this document.

The reason to this is that only data posts that relate to each other (e.g. have the same identifier) are used for later relation pattern detection 600 and relation pattern deviation detection 700.

If the type pattern detection phase 400 is used before the identifier matching phase, data type characteristic Columns with unique values may be defined in phase 400 for each data source. The columns that are identified as Columns with unique values will then be the only possible candidate identifiers. If there is no column identified as Columns with unique values, further analysis of this phase 500 cannot be performed. A Columns with sorted values characteristic may also be used. This characteristic can be achieved in several ways for example via possibilities to query the data in the specific order like n SQL based data bases (ORDER BY). Another example is to explicit sort the data for each column with the characteristic Column with unique values.

If one or both data sources contain multiple columns that have the Columns with unique values characteristics, there will be several candidate identifier combinations, i.e. a column from the first source and a column from the second source. To determine which column combination that will serve as identifiers or if any combination is valid, a matching counter for each candidate identifier combinations of the data is used.

Figure 5:
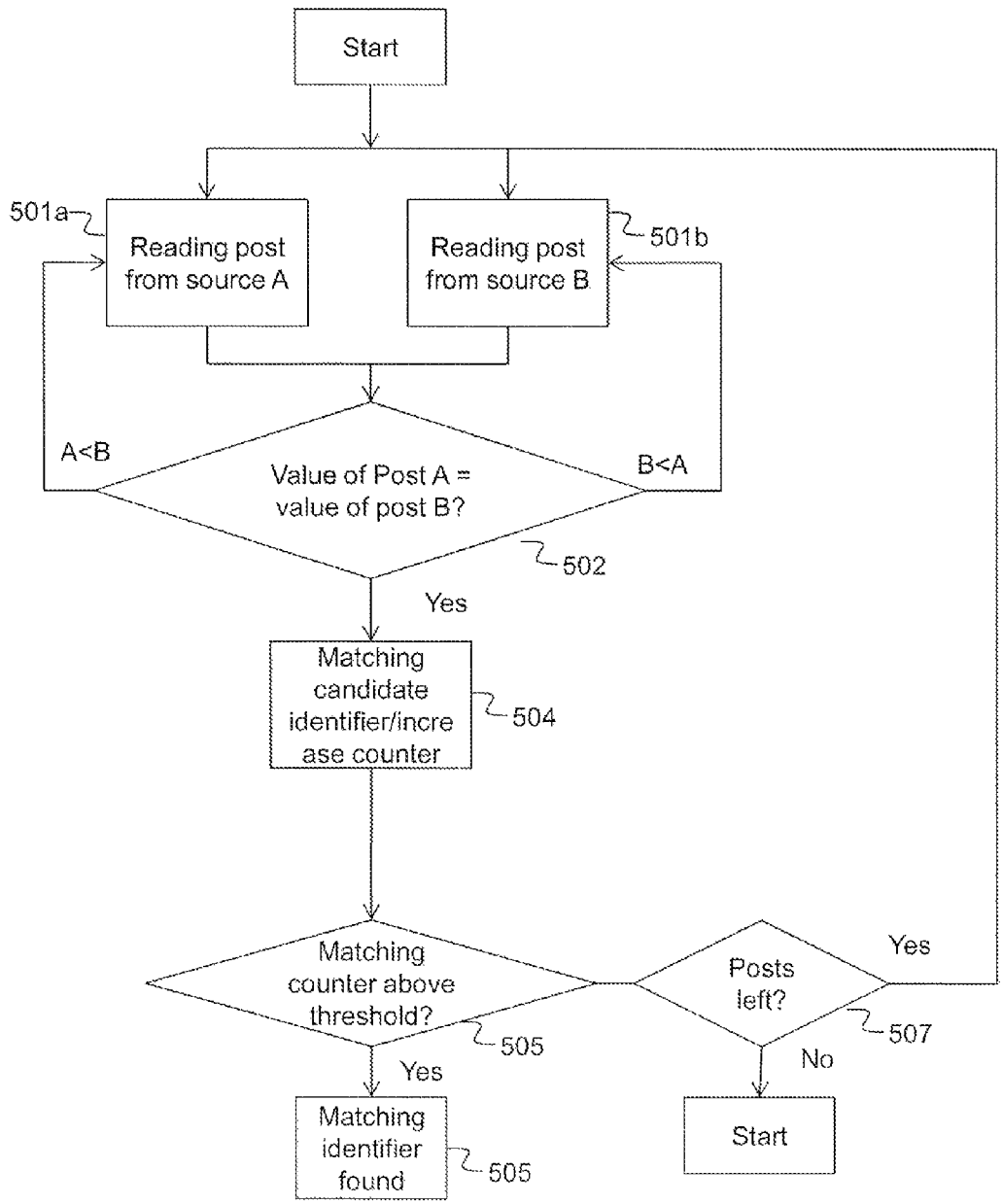

An embodiment of a process for identifier matching 500 is described in the flow chart of FIG. 5. The identifier matching is performed to find the identifier combination of source A and source B out of candidate identifiers. When the process starts, a first data post is read 501a from data source A and a second data post is read 501b from data source B. Thereafter, it is checked 502 whether the value A of the candidate identifier of the first data post is equal to the value B of the candidate identifier of the second data post. If equal, carry on with step 504. If the value A is less than the value B, go back to step 501a and read the next post from source A (in this example the data posts are preferably sorted based on value of candidate identifier). If the value A is after the value B (lexicographical or numerical order), go back to step 501b and read the next post from source B. If no identifier combination is found in step 502, the process for this candidate combination is ended (not shown). In step 504, the following is performed: Matching each candidate identifier combination against a set of identifier relation algorithms. A matching counter for the column intersection is increased if values from its candidate identifier combination match one of the identifier algorithms.

If the matching counter is above 505 a threshold that may be configurable, a matching identifier combination is found and that candidate identifier combination will be treated as the identifier columns further on. If not, and if there are further posts left, the process will be repeated from steps 501a and 501b. If there are no more posts in the sources, the process is ended. An alternative to this process is to manually define or override the matching identifiers for the two data sources.

Relation Pattern Detection 600

A precondition for this phase may be that one column in each data source has been defined as identifiers in phase 500 for this data source combination (different columns can be identifiers in different data source combinations).

The data pattern detection process according to this embodiment is based on counting conformance on a set of relation pattern algorithms between all column combinations of two data sources. Within individual data post pairs, a matrix is created for all column combinations of the first and the second data post. Each relation pattern algorithm has a conformance counter per column matrix intersect. When going through all data post pairs, the conformance counter for an algorithm is increased for a matrix intersect when a conformance is found for that algorithm for that matrix intersect.

There are two types of relation pattern algorithms: static relation pattern algorithms and dynamic relation pattern algorithms. Static relation pattern algorithms are fixed and the behavior is the same independent of previous scanned data, an example of this type of algorithm is the exact match: x=y. Dynamic relation pattern algorithms will adopt the relation pattern and use it as a base for further conformance evaluation. Examples of these algorithms are Levenshtein edit distance and LongestCommonSubstring, where a relation must conform to a specific level of similarity. Dynamic relation pattern algorithms contain also a standard deviation level that indicates the homogenous level of the pattern that the algorithm represents. Due to the nature of the dynamic relation pattern algorithm each matrix intersection has additional variables to those algorithms e.g. mean and standard deviation for similarity based algorithms.

The data pattern detection process according to this embodiment is performed by picking post by post from each data source. If the values from the identifier columns defined in process 500 (or defined in any other way) match the defined identifier algorithm the data will be used for further relation pattern detection. That the identifier columns match the defined identifier algorithm may mean that the data of the identifier column of a post from the first data source matches the data of the identifier column of a post from the second data source. A match may be equal value; partly equal or that identifier value from first data source contains identifier value from second data source, or vice versa. If not, the post with identifier value that is before the other identifier value (order wise) is replaced with next post from its data source according to sequence flow described below.

Figure 6:
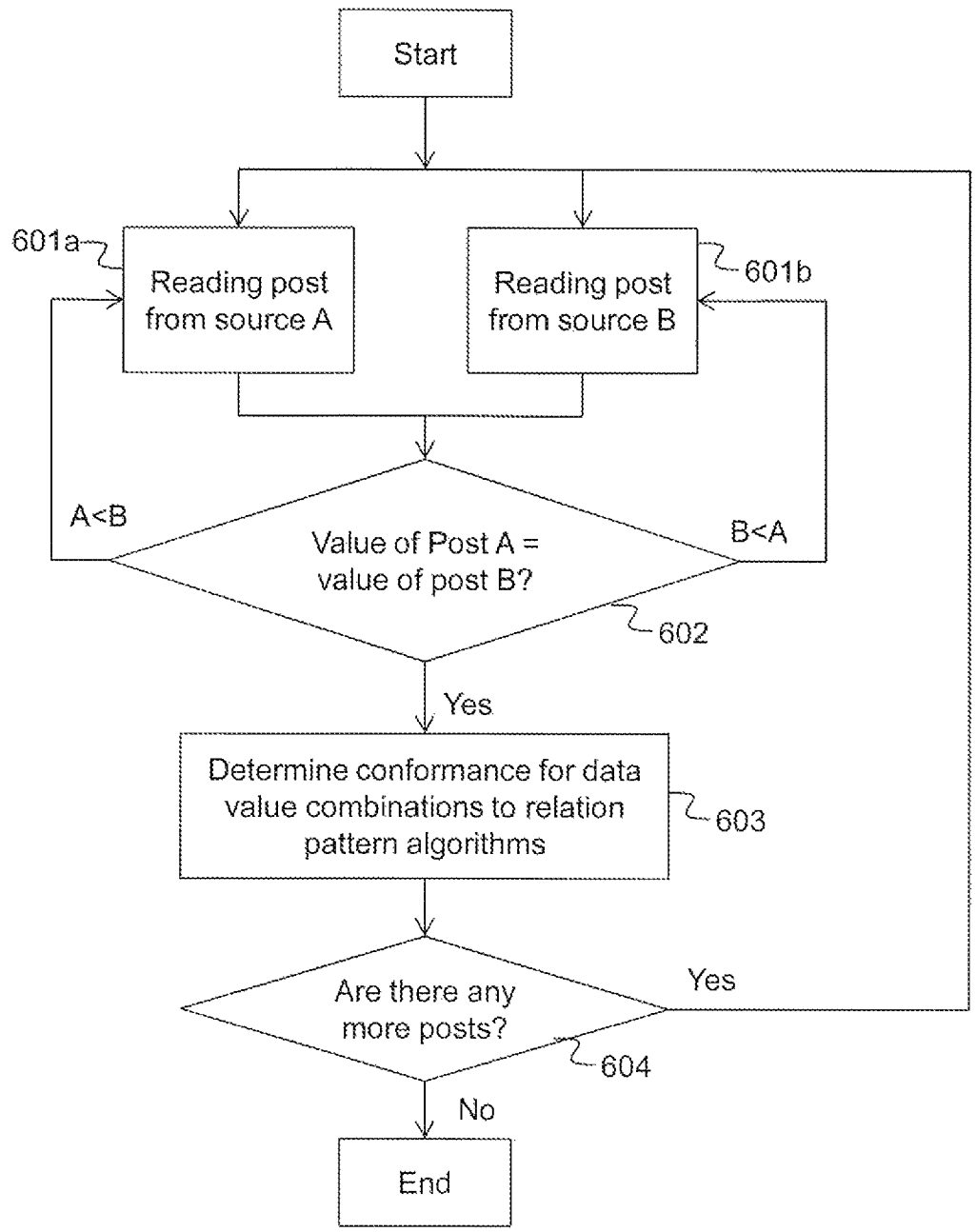

An embodiment of a process for relation pattern detection matching 600 is described in the flow chart of FIG. 6. When the process starts, a first data post is read 601a from data source A and a second data post is read 601b from data source B. Thereafter, it is checked 602 whether the value A of the identifier of the first data post is equal to the value B of the identifier of the second data post. If equal, carry on with step 604. If the value A is less than the value B, go back to step 601a and read the next post from source A (in this example the data posts are preferably sorted based on value of the identifier). If the value A is after the value B (lexicographical or numerical order), go back to step 601b and read the next post from source B. If no identifier value A=identifier value B is found in step 602, the process for this candidate combination is ended (not shown).

On the other hand, for a found data post pair, (identifier value A=identifier value B), conformance for data value combinations to relation pattern algorithms is determined 603. This is determined by analyzing each column value of the first data post (from source A) with each column value of the second data post (from source B). The analysis is done by evaluating if the values conform to one or several of the relation pattern algorithms. If a value combination conforms to an algorithm, a counter in the matrix intersection for that value combination for the conforming algorithm is increased. Dynamic relation pattern algorithms base the conformance on previously adopted values for the values of the corresponding matrix intersection. The new values, used to check the conformance, are adopted and the additional algorithm variables are updated in the matrix intersection. A value combination can conform to multiple algorithms. A counter for the total number of compared posts is also increased in order to later see the relation between algorithms conformance level and total number of analyzed posts.

The conformance level for each algorithm for each matrix intersection is the basis from which the relation algorithm is selected that is to be used for stage 700, relation pattern deviation detection.

In step 604 it is checked whether there are any more data posts, if not the process is ended. If there are more data posts, the process is repeated from 601a and 601b. The results from all analyzed posts are summarized and give the relation pattern algorithm to use (if any) for individual matrix intersections.

In the following an example of step 603 is described. This example contains 3 relation pattern algorithms:
1. Based on String matching (static)
2. Based on Boyer-Moore (X contains Y) (static)
3. Longest Common Substring (dynamic)

TABLE 8

|  |  | Post from data source B | | | | |
|---|---|---|---|---|---|---|
|  |  | B0 | B1 | B2 | B3 | B4 |
|  |  | A1001 | John Smith | +15551234 | male | john.smith@mail.com |
| Post from data source A | A0: A1001 |  |  |  |  |  |
|  | A1: John |  |  |  |  |  |
|  | A2: Smith |  |  |  |  |  |
|  | A3: 5551234 |  |  |  |  |  |

Table 8 above shows the comparison matrix for two data posts, a first data post from data source (even called source) A and a second data post from data source B, the first and second data post making up a data post pair since they have the same value for their identifiers A0 and B0. Each value combination between the first and the second data post pair is evaluated by the relation pattern algorithms. The value combination A1001/A1001 (column A0/B0) conforms to all three algorithms while John/john.smith@mail.com (column A1/B4) only conforms to Boyer-Moore (value from column B1 contains value from A1). It can also conform to dynamic Longest Common Substring if for previous analyzed posts the size of the Longest Common Substring is above configured similarity threshold and within the standard deviation. Non value combinations with the value "male" (column B3) do not conform to any of the algorithms.

Figure 7:
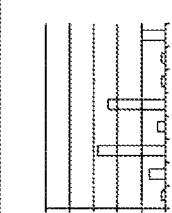
FIG. 7 is an example of a comparison matrix, comparing individual data values of data post pairs, in relation to 7 relation pattern algorithms.
Figure 8:
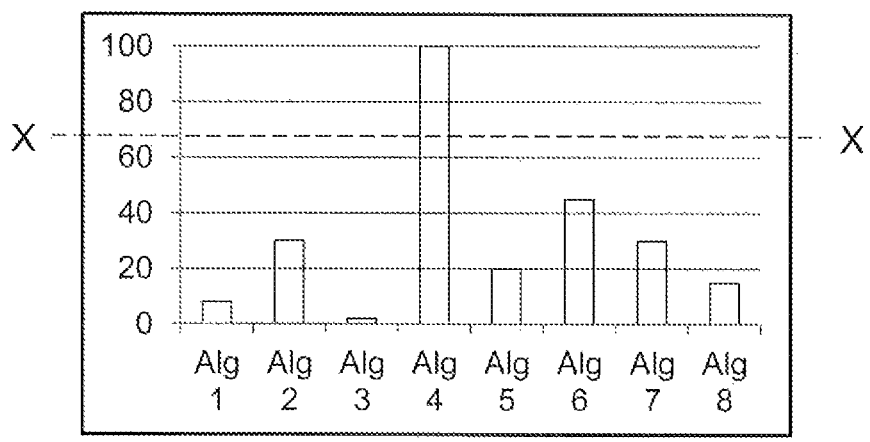
FIG. 8 is a close up of one cell $n_{32}$ of the comparison matrix in FIG. 7

FIG. 7 shows an example of a data value comparison matrix combining values of data post pairs from source A and B. In this example, source A have five columns, A1 to A5, i.e. the data posts in source A have 5 data values each, and source B have four columns, B1 to B4, i.e. the data posts in source B have 4 data values each. In each matrix intersection, i.e. for each combination of data values, there is a conformance counter for each of the relation pattern algorithms. In this specific example there are 7 relation pattern algorithms to choose from. The conformance counter counts conformance for individual data value combinations for the different relation pattern algorithms for all data post pairs. The higher the bar in the diagram in each matrix intersection, the higher the conformance for the relation pattern algorithm for this matrix intersection. As can be seen, different relation pattern algorithms may have highest conformance in different matrix intersections. FIG. 8 is a close-up for the individual data value combination $n_{32}$ (column A3 intersected with column B2). As can be seen in FIG. 8, algorithm 4 has the highest conformance. In fact, it is 100%, or almost 100%. This is also the only algorithm above the threshold X-X. Thus, algorithm 4 will be selected as the relation pattern algorithm to use for detecting deviations for individual data post pairs in the data value combination $n_{32}$.

Relation Pattern Deviation Detection 700

The highest conformance counter value from process 600 determine which relation pattern algorithm to use in each matrix intersect. If the highest conformance counter value represents a dynamic relation pattern algorithm, the additional algorithm variable values are also used. If the highest conformance counter value for a specific matrix intersection is below a configurable threshold, deviation detection will not be performed on combination of data values representing that matrix intersection. If several algorithms counters are above the threshold, a defined priority algorithm decides which algorithm to use for deviation detection. For example, if both an exact match algorithm counter and a "x in y" algorithm counter are above a threshold, the exact match algorithm may have priority over the x in y algorithm. Also, it may be possible that different algorithms have different thresholds.

Figure 9:
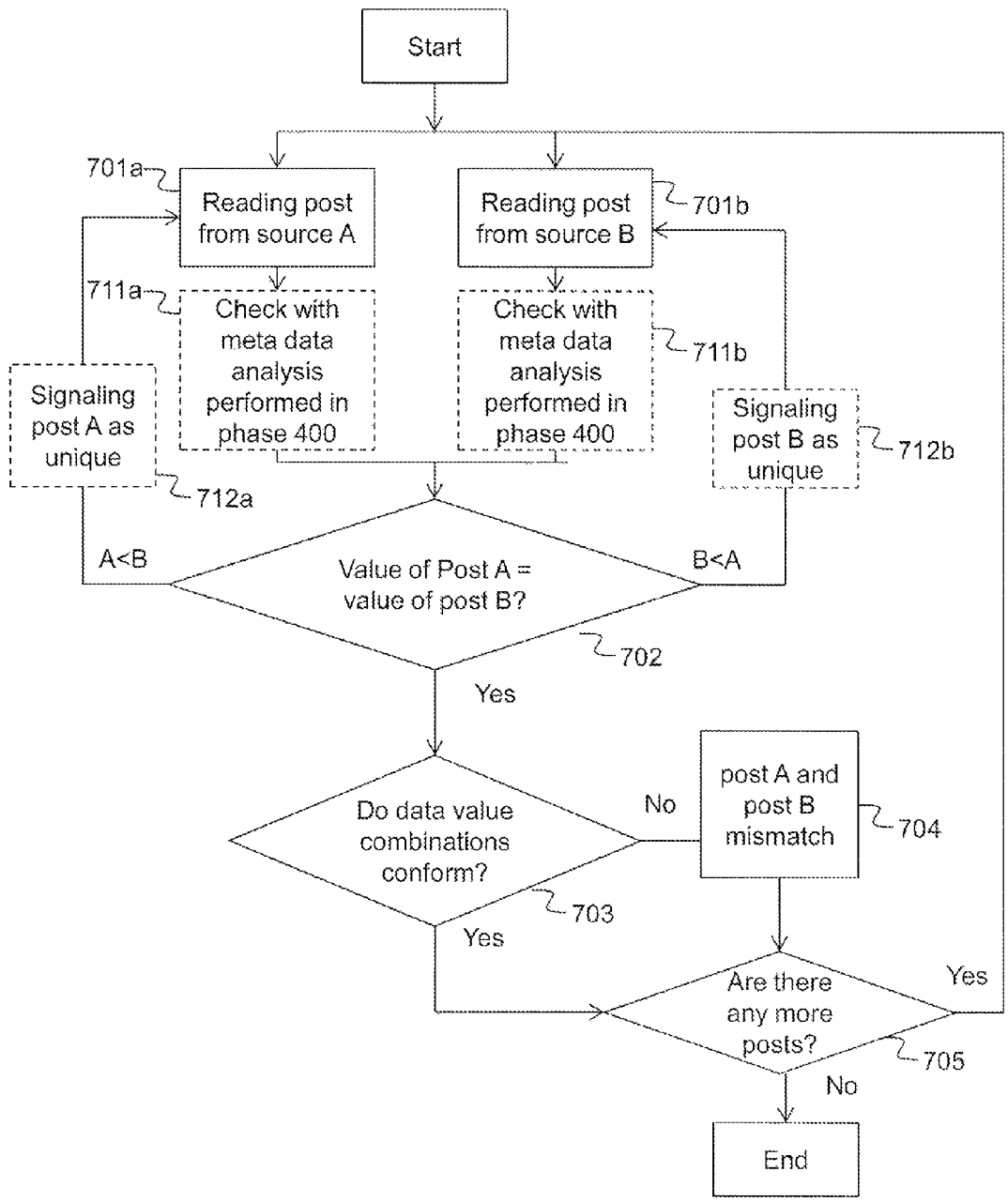
FIG. 9 shows a flow chart describing a method according to an embodiment.

For each data post in the respective data source, data values are analyzed according to the flow chart of FIG. 9, which describes an embodiment of a process for relation pattern deviation detection. When the process starts, a first data post is read 701a from data source A and a second data post is read 701b from data source B. Optionally, the data values of the first data post (the post from data source A) can be checked 711a towards the type pattern algorithm detected in phase 400. If any of the data values of the first data post does not conform to the algorithm it will be signaled as a deviation. Optionally, the data values of the second data post (the post from data source B) can be checked 711b towards the type pattern algorithm detected in phase 400. If any of the data values of the second data post does not conform to the algorithm it will be signaled as a deviation. Thereafter, it is checked 702 whether the value A of the identifier of the first data post is equal to the value B of the identifier of the second data post. If equal, carry on with step 703. If the value A is less than the value B, optionally signal 712a that the first data post is unique, then go back to step 701a and read the next post from source A (in this example the data posts are preferably sorted based on value of the identifier). If the value A is after the value B (lexicographical or numerical order), optionally signal 712b that the second data post is unique, then go back to step 701b and read the next post from source B. If there is a match between the identifier value A of the first data post A and the identifier value B of the second data post B, it is checked whether individual of the data value combinations of these two data posts conforms 703 or not to the relation pattern algorithm selected for each individual data value combination in stage 600. If there is a conformance for the individual data value combination for a data post pair, the process proceeds to step 705 in which it is checked if there are any more data posts to evaluate. If yes, the process is repeated from steps 701a and 701b, if no, the process is ended. On the other hand, in the conformance step 703, if there is a non-conformance found for any of the individual data value combinations, it is signaled 704 that post A and post B are mismatching. When receiving any of the signaled mentioned in this process, an operator may analyze the found mismatches and correct the mismatches.

Going back to FIG. 4, after the relation pattern deviation detection stage 700 has been performed; it is decided 720 whether the whole process of FIG. 4 should be performed in a single sequence or in a recurrent manner. If in a single sequence, the FIG. 4 process is ended, if in a recurrent manner, the scope of the recurrent analysis is decided in step 730, i.e. should the recurrent analysis be performed with the old relation pattern or with an updated relation pattern. The scope of the recurrent analysis, according to this embodiment, may comprise different alternatives: In a first alternative, a new relation pattern deviation detection 700 is performed based on newly detected relation patterns. In a second alternative, which is a variant of the first alternative, the newly detected relation patterns are adopted to earlier detected pattern algorithms such that pattern changes are depending on history, i.e. statistically generated patterns. In a third alternative, the recurrent analysis is performed on a fixed relation pattern, i.e. a relation pattern which is not changed in time.

Figure 10:
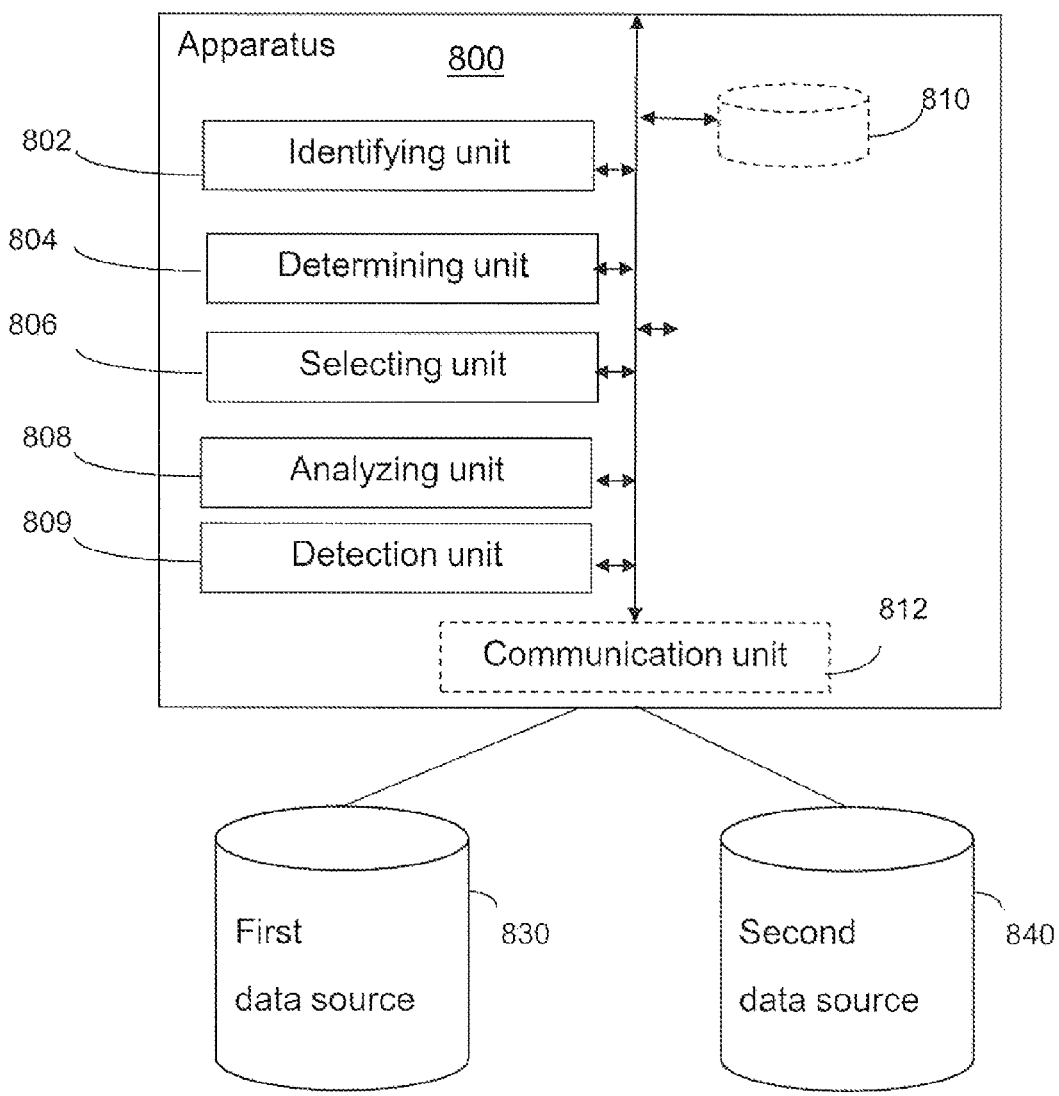
FIG. 10 is a schematic block diagram of an apparatus according to an embodiment of the invention, the apparatus being connected to a first and a second data source.

FIG. 10 describes an embodiment of an apparatus 800 for detecting deviations in data sources, each data source comprising a plurality of data posts, each data post comprising a number of data values. A first data source 830 and a second data source 840 are connected to the apparatus in FIG. 10. The apparatus 800 comprises an identifying unit 802 for identifying data post pairs, each pair comprising a first data post in the first data source 830 and a second data post in the second data source 840, wherein, for a unique matching data attribute of the first data post and the second data post in a data post pair, a subset of the data value is equal. The apparatus 800 further comprises a determining unit 804 for determining whether individual of a plurality of combinations of data values of the first data post with data values of the second data post within each of the plurality of data post pairs fulfil individual of a plurality of relation pattern algorithms, and for determining a conformity level for the determined fulfillment of relation pattern algorithms for the plurality of data post pairs, a selecting unit 806 for selecting relation pattern algorithm from the plurality of relation pattern algorithms based on the determined conformity level, and an analyzing unit 808 for analyzing data value combinations of individual data post pairs in relation to the selected relation pattern algorithm in order to detect data value combinations of individual data post pairs that does not conform to the selected relation pattern algorithm, a non-conformance indicating a possible deviation in data of the individual data post pair. The apparatus 800 may further comprise a communication unit 812, which may be considered to comprise conventional means for communication from and/or to the data sources 830, 840. The apparatus 800 may further comprise one or more storage units or memories 810.

According to an embodiment, the determining unit 804 is arranged for determining the conformity level for combinations of data values relating to same data attribute combination for the plurality of data post pairs.

According to another embodiment, the determining unit 804 being arranged for determining of a fulfillment comprises the determining unit being arranged for combining the data values of the first data post with the data values of the second data post within each of the plurality of data post pairs in a comparison matrix $H_{xy}$ for each of the plurality of data post pairs, where x indicates number of data attributes of the first data post and at the same time indicates number of columns of the matrix and y indicates number of data attributes of the second data post and at the same time indicates number of rows of the matrix.

According to another embodiment, the same data attribute combination concerns same position $n_{ab}$ in the comparison matrix $H_{xy}$ where a=any of integer 1 to x, b=any of integer 1 to y, for the plurality of data post pairs.

According to another embodiment, the selection unit 806 is arranged for selecting relation pattern algorithm by selecting relation pattern algorithms individually for combinations of data values relating to same data attribute combination for the plurality of data post pairs based on the determined conformity level.

According to another embodiment, the apparatus further comprises a detection unit 809 for detecting at least one data attribute in the first data source which data values are unique; and for detecting at least one data attribute in the second data source which data values are unique. The selection unit 806 may further be arranged for selecting, out of the detected at least one data attributes in the first data source and the detected at least one data attributes in the second data source, the data attribute in the first data source and the data attribute in the second data source that has the most data values in common to be the unique matching data attribute of the first data source and the unique matching data attribute of the second data source.

According to another embodiment the apparatus further comprises a sorting unit for sorting the data posts in the first data source 830 and/or the second data source 840 in an increasing or decreasing data value order of data values of the unique matching data attribute.

According to another embodiment, the detection unit 809 is further arranged for detecting, for the first data source 830, meta data for data attributes of the first data source by exposing data values for a set of value type algorithms that determine characteristics of the data values for the data attributes, and for detecting, for the second data source 840, meta data for data attributes of the second data source by exposing data values for a set of value type algorithms that determine characteristics of the data values for the data attributes.

According to another embodiment, the detection unit 809 is arranged for detecting meta data for the first data source by detection of at least one data attribute in the first data source which data values are unique, and the detection unit 809 is arranged for detecting meta data for the second data source by detection of at least one data attribute in the second data source which data values are unique.

According to another embodiment, the selection unit is arranged for only performing the selection of relation pattern algorithm from the plurality of relation pattern algorithms based on the determined conformity level when there exists a relation pattern algorithm out of the plurality of relation pattern algorithms for which the determined conformity level is above a defined threshold.

According to another embodiment, when there are more than one relation pattern algorithm of the plurality of relation pattern algorithms that has a determined conformity level above the defined threshold, the selection unit 806 is arranged to use a priority algorithm for deciding which of the more than one relation pattern algorithms to select.

Figure 11:
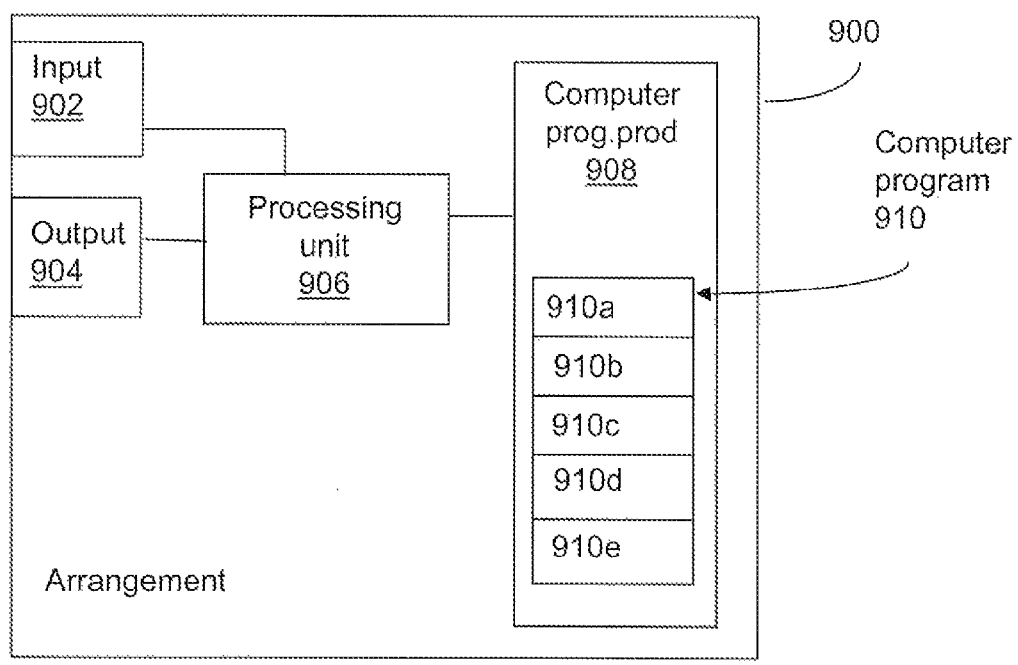
FIG. 11 is a schematic block diagram of an arrangement according to an embodiment of the invention.

FIG. 11 schematically shows an embodiment of an apparatus 900 configured for detecting deviations in data sources, which apparatus also can be an alternative way of implementing an embodiment of the apparatus 800 illustrated in FIG. 10. Comprised in the arrangement 900 is a processing unit 906, e.g. with a DSP (Digital Signal Processor) or a microprocessor. The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity.

Furthermore, the arrangement 900 comprises at least one computer program product 908 in the form of a non-volatile or volatile memory, e.g. an EEPROM (Electrically Erasable Programmable Read-only Memory), a flash memory, a disk drive or a RAM (Random-access memory). The computer program product 908 comprises a computer program 910, which comprises code means, which when executed in the processing unit 906 in the arrangement 900 causes the arrangement to perform the actions of any of the procedures described earlier in conjunction with any of FIG. 1-6 or 9.

The computer program 910 may be configured as a computer program code structured in computer program modules. Hence, in an exemplifying embodiment, the code means in the computer program 810 of the arrangement 800 comprises an identifying module 910a for identifying data post pairs, each pair comprising a first data post in a first data source and a second data post in a second data source, wherein, for a unique matching data attribute of the first data post and the second data post in a data post pair, a subset of the data value is equal. The code means further comprises a first determining module 910b for determining whether individual of a plurality of combinations of data values of the first data post with data values of the second data post within each of the plurality of data post pairs fulfil individual of a plurality of relation pattern algorithms. The code means further comprises a second determining module 910c for determining a conformity level for the determined fulfillment of relation pattern algorithms for the plurality of data post pairs. The code means further comprises a selecting module 910d for selecting relation pattern algorithm from the plurality of relation pattern algorithms based on the determined conformity level. The code means further comprises an analyzing module 910d for analyzing data value combinations of individual data post pairs in relation to the selected relation pattern algorithm in order to detect data value combinations of individual data post pairs that does not conform to the selected relation pattern algorithm, a non-conformance indicating a possible deviation in data of the individual data post pair.

The processing unit 906 may be a single Central processing unit, CPU, but it could also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the apparatus.

Although the code means in the embodiments disclosed above in conjunction with FIG. 11 are implemented as computer program modules which when executed in the processing unit causes the apparatus to perform the actions described above in the conjunction with figures mentioned above, at least one of the code means may in alternative embodiments be implemented at least partly as hardware circuits.

The methods and apparatuses according to embodiments of the invention that have described may have any or more of the following advantages: It is possible to automatically find possible deviations between two large data sources with comparable data posts that may comprise millions of data posts each, for example in databases of mobile communication operators. If such deviations could be alleviated a lot of problems occurring due to faults in the content of databases can be avoided. For example, calls placed in mobile communication networks may not be charged due to mismatches in databases resulting in that it is unclear which person actually placed the call. Further, the embodiments described have support for multiple relation pattern algorithms. it is possible to select the relation pattern algorithm that is best suited for an individual data value combination of a plurality of relation pattern algorithms. Also, it is possible to both detect data attribute type and detect deviations from a detected data attribute type for some data value in a column.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method of detecting deviations in data sources, each data source comprising a plurality of data posts, each data post comprising a number of data values, the method comprising:
   identifying data post pairs, each pair comprising a first data post in a first data source and a second data post in a second data source; wherein, for a unique matching data attribute of the first data post and the second data post in a data post pair, a subset of the data value is equal;
   determining whether an individual of a plurality of combinations of data values of the first data post with data values of the second data post, within each of the plurality of data post pairs, fulfill an individual of a plurality of relation pattern algorithms;
   determining a conformity level for the determined fulfillment of relation pattern algorithms for the plurality of data post pairs;
   selecting a relation pattern algorithm from the plurality of relation pattern algorithms based on the determined conformity level;
   analyzing data value combinations of individual data post pairs in relation to the selected relation pattern algorithm in order to detect data value combinations of individual data post pairs that do not conform to the selected relation pattern algorithm, a non-conformance indicating a possible deviation in data of the individual data post pair.

2. The method of claim 1, wherein the conformity level is determined for combinations of data values relating to same data attribute combination for the plurality of data post pairs.

3. The method of claim 1, wherein the determining of a fulfillment comprises combining the data values of the first data post with the data values of the second data post within each of the plurality of data post pairs in a comparison matrix $H_{xy}$ for each of the plurality of data post pairs, where x indicates number of data attributes of the first data post and at the same time indicates number of columns of the matrix and y indicates number of data attributes of the second data post and at the same time indicates number of rows of the matrix.

4. The method of claim 3, wherein the same data attribute combination concerns same position $n_{ab}$ in the comparison matrix $H_{xy}$, where a=any integer from 1 to x, and where b=any integer from 1 to y, for the plurality of data post pairs.

5. The method of claim 1, wherein the selecting comprises selecting relation pattern algorithms individually for combinations of data values relating to same data attribute combination for the plurality of data post pairs based on the determined conformity level.

6. The method of claim 1, further comprising:
   detecting at least one data attribute in the first data source which data values are unique; and
   detecting at least one data attribute in the second data source which data values are unique; and
   selecting, out of the detected at least one data attributes in the first data source and the detected at least one data attributes in the second data source, the data attribute in the first data source and the data attribute in the second data source that has the most data values in common to be the unique matching data attribute of the first data source and the unique matching data attribute of the second data source.

7. The method of claim 1, further comprising:
   sorting the data posts in the first data source and/or the second data source in an increasing or decreasing data value order of data values of the unique matching data attribute.

8. The method of claim 1, further comprising:
   for the first data source, detecting meta data for data attributes of the first data source by exposing data values for a set of value type algorithms that determine characteristics of the data values for the data attributes;
   in the second data source, detecting meta data for data attributes by exposing data values for a set of value type algorithms that determine characteristics of the data values for the data attributes.

9. The method of claim 8, wherein the detecting of meta data in the first data source comprises the detecting of at least one data attribute in the first data source which data values are unique, and wherein the detecting of meta data in the second data source comprises the detecting of at least one data attribute in the second data source which data values are unique.

10. The method of claim 1, wherein the selecting of the relation pattern algorithm from the plurality of relation pattern algorithms is only performed when there exists a relation pattern algorithm out of the plurality of relation pattern algorithms for which the determined conformity level is above a defined threshold.

11. The method of claim 10, wherein, when there are more than one relation pattern algorithm of the plurality of relation pattern algorithms that has a determined conformity level above the defined threshold, the selecting of relation pattern algorithm comprises using a priority algorithm to decide which of the more than one relation pattern algorithms to select.

12. An apparatus for detecting deviations in data sources, each data source comprising a plurality of data posts, each data post comprising a number of data values, the apparatus comprising:
an identifying circuit configured to identify data post pairs, each pair comprising a first data post in a first data source and a second data post in a second data source; wherein, for a unique matching data attribute of the first data post and the second data post in a data post pair, a subset of the data value is equal;
a determining circuit configured to:
determine whether an individual of a plurality of combinations of data values of the first data post with data values of the second data post, within each of the plurality of data post pairs, fulfill an individual of a plurality of relation pattern algorithms; and
determine a conformity level for the determined fulfillment of relation pattern algorithms for the plurality of data post pairs;
a selecting circuit configured to select a relation pattern algorithm from the plurality of relation pattern algorithms based on the determined conformity level; and
an analyzing circuit configured to analyzing data value combinations of individual data post pairs in relation to the selected relation pattern algorithm in order to detect data value combinations of individual data post pairs that do not conform to the selected relation pattern algorithm, a non-conformance indicating a possible deviation in data of the individual data post pair.

13. The apparatus of claim 12, wherein the determining circuit is configured to determine the conformity level for combinations of data values relating to same data attribute combination for the plurality of data post pairs.

14. The apparatus of claim 12, wherein the determining circuit is configured to combine the data values of the first data post with the data values of the second data post within each of the plurality of data post pairs in a comparison matrix $H_{xy}$, for each of the plurality of data post pairs, where x indicates number of data attributes of the first data post and at the same time indicates number of columns of the matrix, where y indicates number of data attributes of the second data post and at the same time indicates number of rows of the matrix.

15. The apparatus of claim 14, wherein the same data attribute combination concerns same position $n_{ab}$ in the comparison matrix $H_{xy}$, where a=integer from 1 to x, and where b=any integer from 1 to y, for the plurality of data post pairs.

16. The apparatus claim 12, wherein the selection circuit is configured to select the relation pattern algorithm by selecting relation pattern algorithms individually for combinations of data values relating to same data attribute combination for the plurality of data post pairs based on the determined conformity level.

17. The apparatus of claim 12, further comprising:
a detection circuit configured to:
detect at least one data attribute in the first data source which data values are unique; and
detect at least one data attribute in the second data source which data values are unique;
wherein the selection circuit is configured to select, out of the detected at least one data attributes in the first data source and the detected at least one data attributes in the second data source, the data attribute in the first data source and the data attribute in the second data source that has the most data values in common to be the unique matching data attribute of the first data source and the unique matching data attribute of the second data source.

18. The apparatus of claim 12, further comprising a sorting circuit configured to sort the data posts in the first data source and/or the second data source in an increasing or decreasing data value order of data values of the unique matching data attribute.

19. The apparatus of claim 12, wherein the detection circuit is further configured to:
detect, for the first data source, meta data for data attributes of the first data source by exposing data values for a set of value type algorithms that determine characteristics of the data values for the data attributes; and
detect, for the second data source, meta data for data attributes of the second data source by exposing data values for a set of value type algorithms that determine characteristics of the data values for the data attributes.

20. The apparatus of claim 19, wherein:
the detection circuit is configured to detect meta data for the first data source by detection of at least one data attribute in the first data source which data values are unique; and
the detection circuit is configured to detect meta data for the second data source by detection of at least one data attribute in the second data source which data values are unique.

21. The apparatus claim 12, wherein the selection circuit is configured to only perform the selection of relation pattern algorithm from the plurality of relation pattern algorithms when there exists a relation pattern algorithm out of the plurality of relation pattern algorithms for which the determined conformity level is above a defined threshold.

22. The apparatus of claim 21, wherein the selection circuit is configured to, when there are more than one relation pattern algorithm of the plurality of relation pattern algorithms that has a determined conformity level above the defined threshold, use a priority algorithm for deciding which of the more than one relation pattern algorithms to select.

23. A non-transitory computer readable medium storing executable computer instructions for detecting deviations in data sources, each data source comprising a plurality of data posts, each data post comprising a number of data values, the computer instructions when executed by a processing circuit causes the processing circuit to:
identify data post pairs, each pair comprising a first data post in a first data source and a second data post in a second data source; wherein, for a unique matching data attribute of the first data post and the second data post in a data post pair, a subset of the data value is equal;
determine whether an individual of a plurality of combinations of data values of the first data post with data values of the second data post, within each of the plurality of data post pairs, fulfill an individual of a plurality of relation pattern algorithms;

determine a conformity level for the determined fulfillment of relation pattern algorithms for the plurality of data post pairs;

select a relation pattern algorithm from the plurality of relation pattern algorithms based on the determined conformity level;

analyze data value combinations of individual data post pairs in relation to the selected relation pattern algorithm in order to detect data value combinations of individual data post pairs that do not conform to the selected relation pattern algorithm, a non-conformance indicating a possible deviation in data of the individual data post pair.

* * * * *